(12) United States Patent
Kanasugi et al.

(10) Patent No.: US 9,030,266 B2
(45) Date of Patent: May 12, 2015

(54) WAVE FORM DISTORTION REMOVING APPARATUS FOR A COMMUNICATION NETWORK

(75) Inventors: Katsumi Kanasugi, Wako (JP); Yoshihiro Mishio, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 13/381,321

(22) PCT Filed: Jun. 10, 2011

(86) PCT No.: PCT/JP2011/063361
§ 371 (c)(1),
(2), (4) Date: Dec. 28, 2011

(87) PCT Pub. No.: WO2011/155597
PCT Pub. Date: Dec. 15, 2011

(65) Prior Publication Data
US 2013/0069740 A1    Mar. 21, 2013

(30) Foreign Application Priority Data

Jun. 11, 2010  (JP) ................................ 2010-134461

(51) Int. Cl.
*H04B 15/00*  (2006.01)
*H04B 3/30*  (2006.01)
*H04L 25/02*  (2006.01)

(52) U.S. Cl.
CPC ............... *H04B 15/005* (2013.01); *H04B 3/30* (2013.01); *H04L 25/0298* (2013.01)

(58) Field of Classification Search
CPC .......... H04B 3/28; H04B 15/005; H04B 3/30; H03H 1/0007; H04L 25/0298
USPC ................................................. 333/22 R, 12
See application file for complete search history.

(56) References Cited

U.S. PATENT DOCUMENTS

| 5,734,658 A | 3/1998 | Rall et al. |
| 2008/0204172 A1 | 8/2008 | Sakai et al. |

FOREIGN PATENT DOCUMENTS

| JP | 33-10251 B1 | 11/1958 |
| JP | 56-121332 U | 9/1981 |
| JP | 7-500463 A | 1/1995 |
| JP | 2004-135185 A | 4/2004 |
| JP | 2006-332973 A | 12/2006 |
| JP | 2007-201697 A | 8/2007 |
| JP | 2009-129649 A | 6/2009 |

OTHER PUBLICATIONS

Office Action, Decision to Grant a Patent, dated May 7, 2014, issued in corresponding Japanese Patent Application 2011-553219 and English translation thereof.

*Primary Examiner* — Robert Pascal
*Assistant Examiner* — Kimberly Glenn
(74) *Attorney, Agent, or Firm* — Carrier Blackman & Associates, P.C.; Joseph P. Carrier; Jeffrey T. Gedeon (57) ABSTRACT

In a communication network having a first electronic control unit, a second electronic control unit, a transmission path connecting them, and a third electronic control unit connected to a branch path and communicatable with the first and second electronic control units that are each terminated with a termination circuit designed in accordance with a characteristic impedance of the transmission path, it is configured to comprise a connector that is connected to a connection point mounted on a circuit board in which the third electronic control unit is installed so that the third control unit is connected to the branch path via the connector and a conducting wire for removing a waveform distortion connected to the branch path via the connector at one end.

9 Claims, 9 Drawing Sheets

WITHOUT STUB FILTER

FIG.12B

STUB FILTER + GAIN R (300 Ω)

FIG.12C

STUB FILTER + GAIN R (100 Ω)

WAVE FORM DISTORTION REMOVING APPARATUS FOR A COMMUNICATION NETWORK

CROSS-REFERENCE TO RELATED APPLICATION

This Application is a National Stage entry of International Application No. PCT/JP2011/063361, having an international filing date of Jun. 10, 2011; which claims priority to Japanese Application No.: 2010-134461, filed Jun. 11, 2010, the disclosure of each of which is hereby incorporated in its entirety by reference.

TECHNICAL FIELD

This invention relates to a communication network, particularly to a communication network installed in transportation equipment, such as a vehicle.

BACKGROUND ART

In a communication network having a plurality of electronic control units connected to a transmission path in order to communicate with each others by sending signals through the transmission path, it is a problem to have a waveform distortion caused by a reflection and/or ringing of the signal.

The technique of Patent Reference 1 is configured to have a ferrite bead as an attenuation element at a node (the connection end of the electronic control unit) of the transmission path in order to eliminate a harmonic noise. It is also well-known to have a circuit element such as L, R, and C instead of a ferrite bead.

The technique of Patent Reference 2 is configured to have a filter comprising a resistor and a coil connected in parallel at a branch connector installed in the transmission path, thereby attenuating a signal component of frequency band in the reflected wave.

PRIOR ART REFERENCE

Patent Reference

Patent Reference 1: Published Japanese Translation of PCT international publication for Patent Application No. Hei7 (1996)-500463
Patent Reference 2: Japanese Laid-Open Patent Application No. 2007-201697

SUMMARY

Problems to be Solved

The technique of Patent Reference 1 has the ferrite bead at each node of the transmission paths, so that the structure becomes complicated. This is not desirable especially in transportation equipment such as a vehicle since a disposing space is limited and it increases the costs disadvantageously. Since the technique of Patent Reference 2 requires a filter circuit at each branch connector installed in the transmission paths, it also has the same disadvantages.

An object of this invention is therefore to overcome the foregoing drawbacks by providing a communication network that can remove distortions of signal waveforms among electronic control units connected to transmission paths or branch connectors with simple structure.

Means for Solving the Problems

In order to achieve the first object of this disclosure, the disclosed apparatus is configured to have a communication network having a first electronic control unit, a second electronic control unit, a transmission path connecting the first and second electronic control units, and a third electronic control unit connected to a branch path branched off from the transmission path and communicatable with at least one of the first and second electronic control units, the first and second electronic control units being each terminated with a termination circuit designed in accordance with a characteristic impedance of the transmission path, characterized in that a connection point is mounted on a circuit board in which the third electronic control unit is installed so that the third electronic control unit is connected to the branch path via a connector; and a conducting wire for removing a waveform distortion is connected to the branch path via the connector at one end.

In a second aspect of the disclosed apparatus, the conducting wire is connected to the branch path via a resistor.

In a third aspect of the disclosed apparatus, the conducting wire is connected to the branch path at the other end.

In a fourth aspect of the disclosed apparatus, the conducting wire is constituted of a twisted pair wire.

Effects

According to the first aspect of this disclosure, in the communication network configured to have a third electronic control unit connected to a branch path branched off from the transmission path and communicatable with at least one of the first and second electronic control units, a connection point is mounted on a circuit board in which the third electronic control unit is installed so that the third electronic control unit is connected to the branch path via a connector, and a conducting wire for removing a waveform distortion is connected to the branch path via the connector at one end. With this, it becomes possible to remove waveform distortions of signals with a simple structure.

Specifically, the terminal of the conducting wire connected to the branch path is, for example, each made open (not connected) at one end, so that total reflection of the communication waveform occurs at the edge face. As a result, it becomes possible to use the conducting wire as a band-pass filter of (¼) λ, (λ: wavelength).

More specifically, the first, second and third electronic control units are energized so that the received waveforms thereof are measured, and frequency components including a distortion of the received waveforms of the control units are analyzed using an FFT in order to calculated frequency components of the distortion to be removed. Then, the length of the conducting wire is determined to be (¼) λ of the frequency of the calculated frequency components so as to remove the waveform distortions of the signals.

Further, since it is possible to obtain desired filtering characteristics without changing the design of the electronic control units but externally adding a conducting wire, the configuration becomes simple. Also it becomes possible to change the design of wiring harness topologies until the final stage of development thereby improving the efficiency of mass production and development of the communication network.

Further, it is configured so that the connection point is mounted on the circuit board, in which the third electronic control unit is installed, so as to be connected to the branch path via the connector. In other words, since it is configured not to have the connection point on the branch path, it becomes possible to enhance reliability of the connection point.

The communication network according to the second aspect of this disclosure is configured to connect the conducting wire to the branch path via a resistor. With this, it becomes possible to arbitrarily control the gain of the abovementioned filter (conducting wire) by applicably selecting the resistance value of the resistor.

The communication network according to the third aspect of this disclosure is configured to connect the conducting wire to the branch path at the other end. With this, the signal transmission time differs from the one of the branch path as explained later, so that it becomes possible to remove distortions of signals.

The communication network according to the second aspect of this disclosure is configured so that the conducting wire is constituted of a twisted pair wire. With this, it becomes possible to prevent the network from external disturbances and/or noises to be applied, thereby enhancing noise durability.

DESCRIPTION OF EMBODIMENTS

Embodiments for carrying out a communication network according to this invention will now be explained with reference to the attached drawings.

First Embodiment

Figure 1:
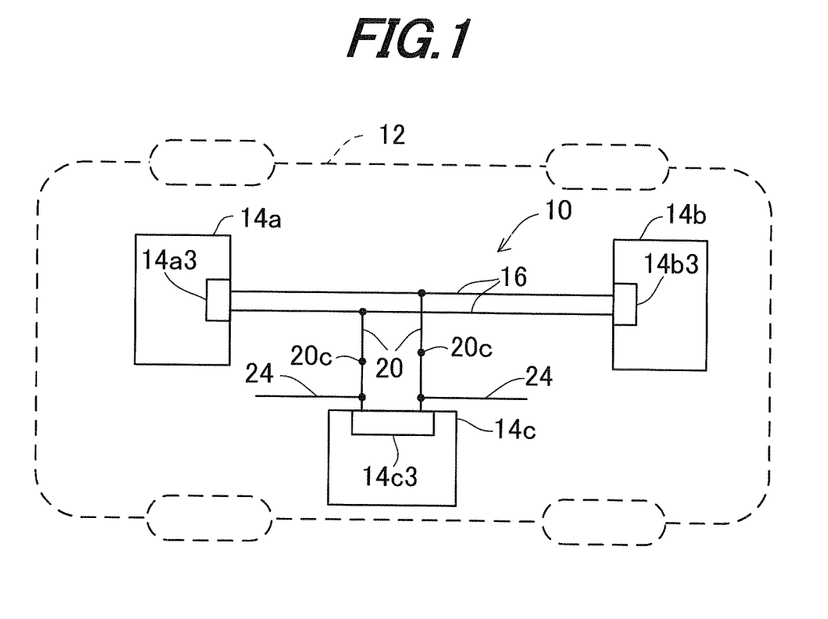
FIG. 1 is an overall schematic view showing a communication network according to a first embodiment of this invention.

FIG. 1 is an overall schematic view showing a communication network according to a first embodiment of this invention.

In FIG. 1, reference numeral 10 designates a communication network. The communication network 10 is installed in transportation equipment such as a vehicle 12.

The communication network 10 has two Electronic Control Units (each hereinafter referred to as ECU) 14a, 14b, a bus (transmission path) 16 connecting the ECUs, and an ECU 14c communicatable with at least one of the ECUs 14a, 14b through a branch path 20 branched off from the bus 16.

The three ECUs 14, i.e. ECUs 14a, 14b, 14c, are connected to each others through the bus 16 and branch path 20. Although not illustrated, each of the ECUs 14 comprises a microcomputer having CPU, ROM, RAM, I/O, etc., and is accommodated in an appropriate case (housing).

Each of the ECUs 14 receives outputs of sensors representing an operating condition of the vehicle 12 and controls operations of devices of the vehicle 12 in response thereto. For instance, the ECU 14a controls operations of an internal combustion engine installed in the vehicle 12, the ECU 14b a transmission, and the ECU 14c an electronic motor for power steering.

The bus 16 and branch path 20 are composed of two wire harness (conductors (conducting wires); hereinafter called "harness"), i.e. a twisted pair wire; and the communication network 10 comprises a two-wired transmission medium. The harness (the twisted pair wire) including the bus 16 is specifically made of copper, 0.5 millimeters across in diameter, and covered in vinyl material.

The length of the harness including the bus 16 and branch path 20 is, for example, 6 meters long in the vehicle 12.

Figure 2:
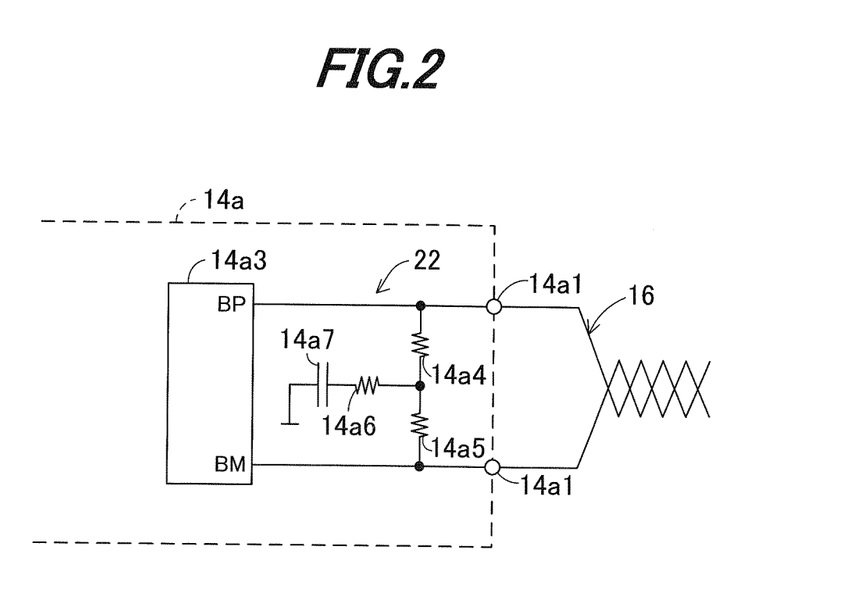
FIG. 2 is a block diagram showing a detailed configuration of a connection end of one of ECUs and its vicinity with a transmission path (bus) shown in FIG. 1.

FIG. 2 is a block diagram showing a detailed configuration of the connection end of the ECU 14a and its vicinity with the bus 16.

As illustrated, the harness including the bus 16 and composed of the twisted pair wire is connected to a BP (Bus Plus) terminal and a BM (Bus Minus) terminal of a bus driver 14a3 of the ECU 14a via a connector 14a1.

Wires of the twisted pair wire composing the harness are connected to each other via resistors 14a4, 14a5 in between the connector 14a1 and the bus driver 14a3, and the harness is grounded through a resistor 14a6 and capacitor 14a7.

The ECU 14a is terminated at a connection end of the bus 16 by a termination circuit 22 designed in accordance with a characteristic impedance of the bus 16. Although not illustrated, the ECU 14b connected to the other end of the bus 16 is configured to connect to a bus driver 14b3 thereof via the termination circuit 22 in a similar manner to the configuration of the ECU 14a. However, a bus driver 14c3 of the ECU 14c is connected to the branch path 20 without a termination circuit.

The termination circuit 22 is each has a property corresponding to the characteristic impedance of the path (bus 16) and represents a circuit configured to prevent the waveforms from reflections and/or ringing of signals by consuming power and thereby generating heat at the impedance when conducting communication among the ECUs 14.

With the communication network 10 configured as above, communication among the ECUs 14a, 14b, 14c is conducted by transmitting digital signals (0, 1) to each other through the bus (transmission path) 16 and branch path 20.

A conducting wire 24 for removing a waveform distortion is each connected to the branch path 20 at position in between the center 20c of each wire of the branch path 20 (i.e. a point corresponding to a half length of each wire of the branch path 20) and the ECU 14c; specifically a point adjacent to the ECU 14c.

The conducting wire 24 is each configured in the same way as that of the bus 16 and branch path 20, i.e., it includes one of the wires of the twisted pair wire, is made of copper, 0.5 millimeters across in diameter, and covered in vinyl material. One of the conducting wires 24 is connected to the wire of the branch path 20 connected to the BP terminal (BP line) and another one of the conducting wires 24 is connected to the BM terminal (BM line) at one end, while the wires 24 are made open (not connected) at the other end.

Figure 3:
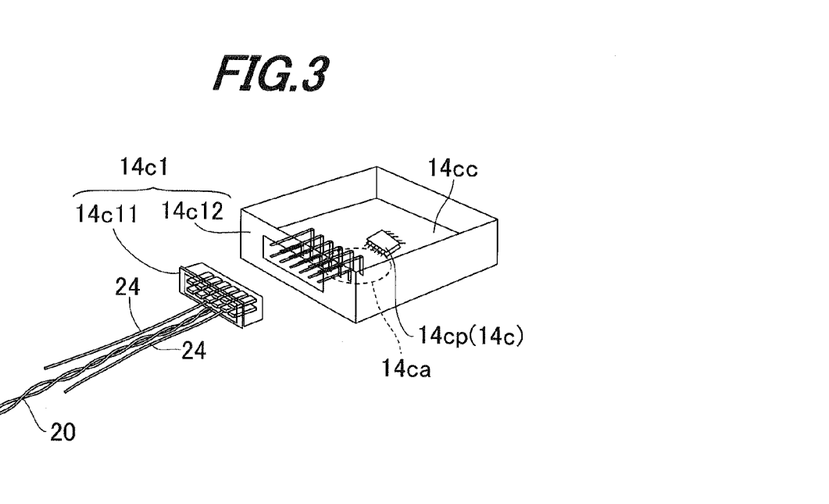
FIG. 3 is a perspective view showing a detailed configuration of a connector of the ECU shown in FIG. 2.
Figure 4:
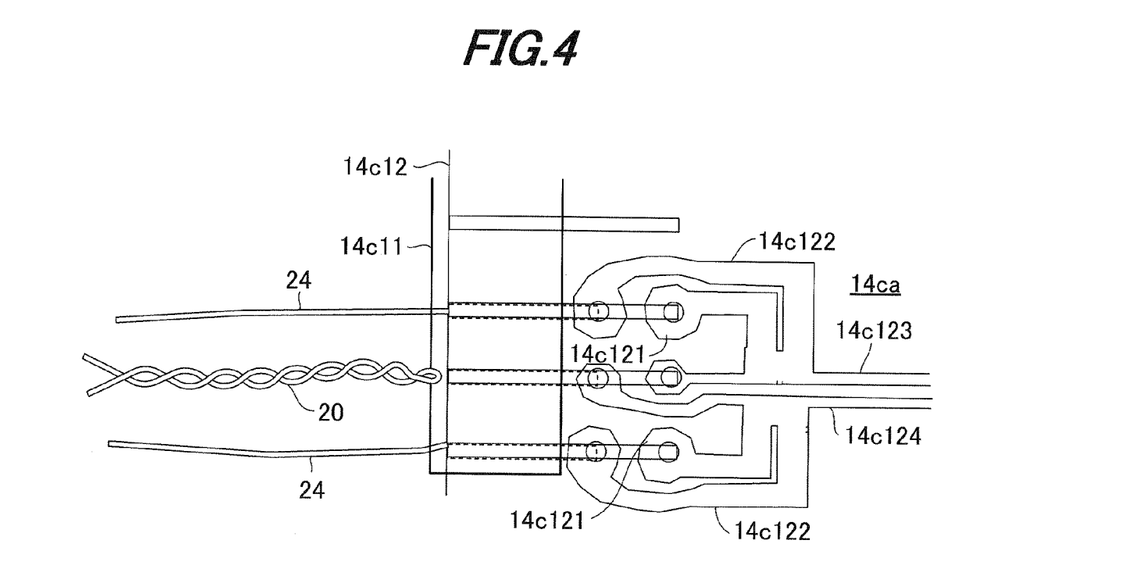
FIG. 4 is a partial top view showing the connector, etc., shown in FIG. 3.

FIG. 3 is a perspective view showing a detailed configuration of a connector 14c1 of the ECU 14c, and FIG. 4 is a partial top view thereof.

As illustrated, the connector 14c1 has a male part 14c11 and female part 14c12. The female part 14c12 is mounted on a circuit board 14cc in which a CPU 14cp functioning as the ECU 14c is installed. The male part 14c11 is connected to the branch path 20 constituted of the twisted pair wire and to the conducting wires 24 on the both sides thereof.

As illustrated in FIG. 4, the branch path 20 constituted of the twisted pair wire and the conducting wires 24 are connected to upper and lower lead terminals of the male part 14c11 so as to be connected to the upper lead terminals 14c121 and lower lead terminals 14c122 of the female part 14c12 when the male part 14c11 is engaged with the female part 14c12.

The upper and lower sides lead terminals 14c121, 14c122 are connected to the bus driver 14c (not shown) via a BP terminal-side lead terminal 14c123 and a BM terminal-side lead terminal 14c124.

As foregoing, it is configured so that a connection point 14ca is mounted on the circuit board 14cc, in which the ECU 14c is installed, so as to be connected to the branch path 20 via the connector 14c1, and that the conducting wires 24 for removing a waveform distortion are connected to the branch path 20 via the connector 14c1.

The terminal at the other end of the conducting wire 24 is each made open (not connected) so that total reflection of communication waveforms among the ECUs 14a, 14b and the ECU 14c occurs at the edge face. As a result, it becomes possible to use the conducting wire as a band-pass filter of (¼) λ (λ: wavelength). The conducting wire 24 is called the "stub filter" hereinafter.

The filter designing will be explained with reference to FIG. 5. First, a layout of the ECUs 14, i.e., a layout of the ECUs 14a, 14b, 14c should be designed. Thereafter, the routes and branches/lengths of the wires (communication topologies) are temporarily determined (designed) and the ECUs 14 and the harness (bus 16 and branch path 20) should be wired in accordance with the determined design. Then, the ECUs 14 should be energized so that the received waveforms thereof are measured.

Figure 5:
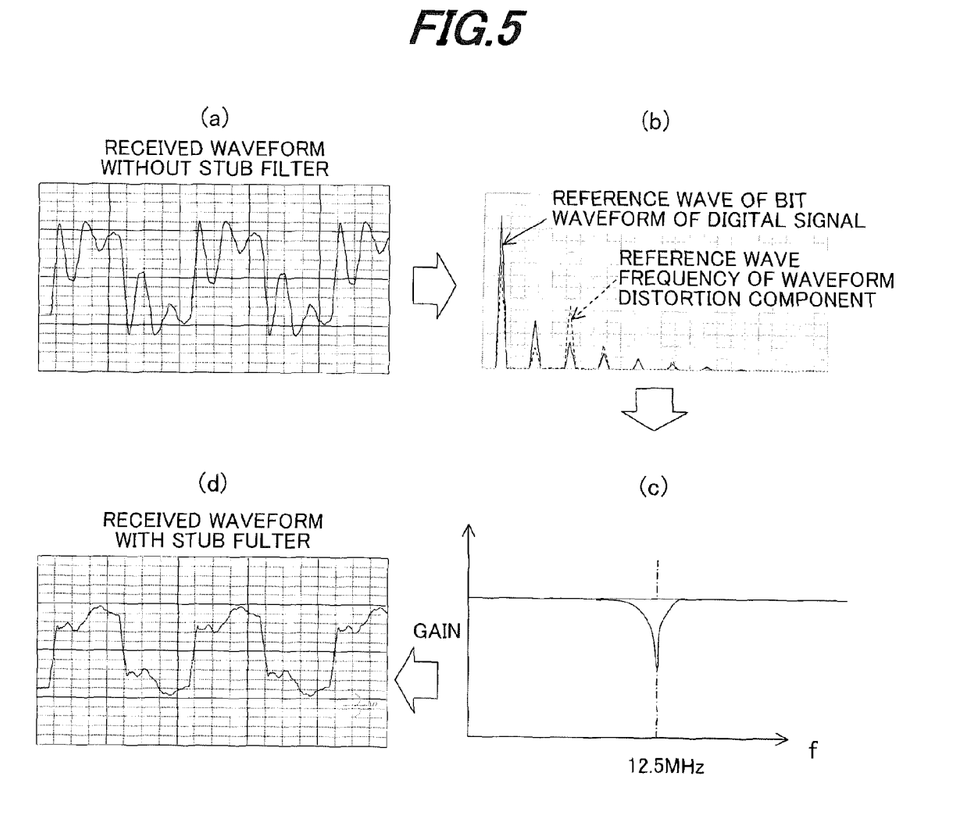
FIG. 5 is a set of graphs for explaining design procedures of the conducting wire (stub filter) shown in FIG. 1.

Next, frequency components including a distortion of the received waveforms of the ECUs 14, more precisely of the ECU 14c as shown in FIG. 5A, should be analyzed using an FFT in order to calculate frequency components (drawn by dashed line) of the distortion to be removed as shown in FIG. 5B.

Next, the length of the stub filter 24 should be determined to be (¼) λ of the frequency of the calculated frequency components (reference wave). In the case of the FIG. 5C, since the frequency f to be removed is calculated as 12.5 MHz, the length of the stub filter 24 is determined to be, for example, approximately 4.2 meters; and then the stub filter 24 is connected to the branch path 20.

The aforementioned operations with the exception of the layout designing of the ECUs 14 should be executed by, for example, performing a communication waveform simulation based on a model for physical layer components concerned such as the bus drivers, manufacturing a trial product or the like.

FIG. 5D shows the waveform after connecting the stub filter 24 to the branch path 20. As shown in the graph, the waveform distortion of the signals has been removed owing to the filter 24.

The connection point of the stub filter 24 to the branch path 20 will now be explained with reference to FIG. 6.

A waveform shaping effect on the ECU 14c depends on the connection point where the stub filter 24 is connected to the branch path 20. As shown in FIG. 6A, the shaping effect improves as the connection point is positioned closer to the ECU 14c.

Figure 6:
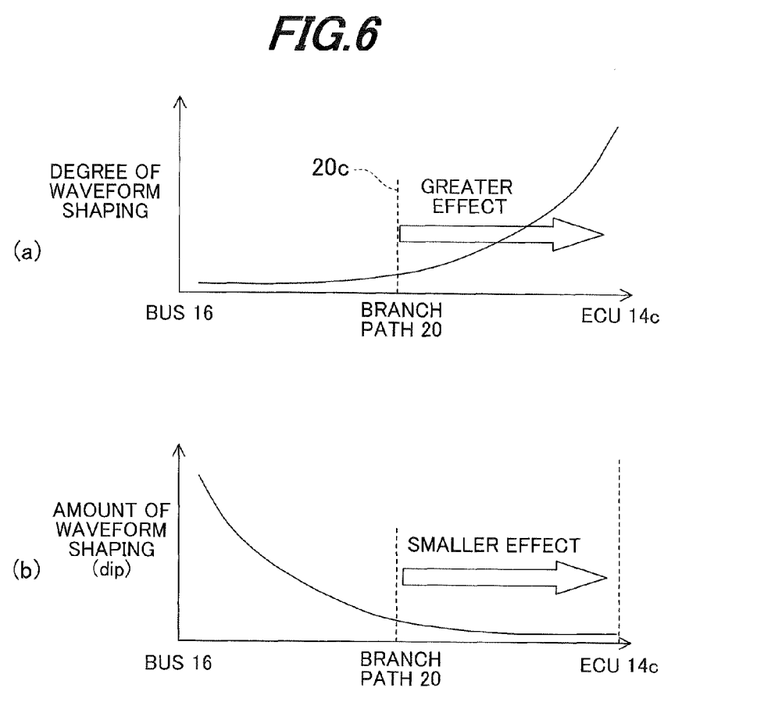
FIG. 6 is a set of graphs for explaining a connection point of a conducting wires (stub filter) to the branch path shown in FIG. 1.

On the other hand, as illustrated in FIG. 6B, since the ECUs 14a, 14b are also affected by the effect, although it is not necessary to shape the waveforms when the ECUs 14a, 14b are terminated with the termination circuits 22 designed in accordance with the characteristic impedance of the bus 16 as in this embodiment, it may unnecessarily change the waveforms.

In this embodiment, the stub filter 24 is therefore connected to the branch path 20 at a position between the center 20c of each wire of the branch path 20 and the ECU 14c. Owing to this, it becomes possible to enhance the shaping effect for the communication waveforms of the ECU 14c while preventing the communication waveforms of the ECU 14a, 14b from being affected by the effect and changing the shapes.

As stated above, the connection point 14ca is mounted on the circuit board 14cc in which the ECU 14c is installed so that the ECU 14c is connected to the branch path 20 via the connector 14c1, and the conducting wire 24 for removing the waveform distortion is connected to the branch path 20 via the connector. Specifically, the conducting wire 24 is connected to the branch path 20 at one end and is made open at the other end. With this, since it can use the conducting wire 24 as a band-pass filter, it becomes possible to remove distortions of signals with a simple structure.

Further, since it only requires to connect the conducting wire (stub filter) 24 to the branch path 20 so that the communication network 10 can be provided with a simple structure, it is preferable to be applied to transportation equipment, such as the vehicle 12 whose disposing space is limited.

In addition, although the group of wires including conducting wires 24, i.e., wire harness is prepared for a particular use, it is configured to modify the length of the conducting wire (stub filter) 24 in accordance with the frequency to be removed and not to distribute the conducting wire inside of the ECUs 14. Consequently, it becomes possible to decrease the cost of the communication network 10 by sharing the ECUs 14.

Further, it is configured so that the connection point 14ca is mounted on the circuit board 14cc, in which the ECU 14c is installed, so as to be connected to the branch path 20 via the connector 14c1. In other words, since it is configured not to have the connection point 14ca on the branch path 20, it becomes possible to enhance reliability of the connection point 14ca.

Further, since it is configured to connect the stub filter 24 to the branch path 20 at the position between the center 20c of the branch path 20 and the ECU 14c, specifically to the branch path 20 at the point adjacent to the ECU 14c; it becomes possible to enhance the shaping effect for the communication waveforms of the ECU 14c while preventing the communication waveforms of the ECU 14a, 14b from being affected by the effect and changing the shapes.

Second Embodiment

Figure 7:
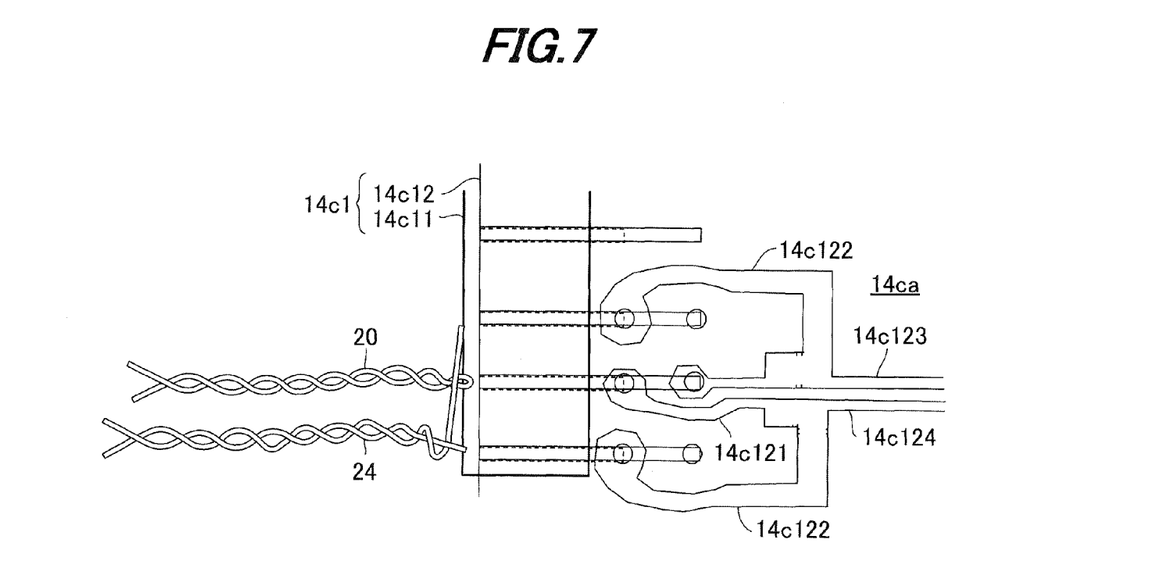
FIG. 7 is a partial top view similar to FIG. 4, but showing a connector of a communication network according to a second embodiment of this invention.

FIG. 7 is a partial top view similar to FIG. 4, but showing the connector 14c1 of the ECU 14c of a communication network according to a second embodiment of this invention.

The second embodiment will be explained with focus on the points of difference from the first embodiment. In the communication network 10 according to the second embodiment, the stub filter (conducting wire) 24 connected to the branch path 20 is constituted of a twisted pair wire.

Specifically, since the communication network 10 sends and receives waveforms through two communication lines, i.e., the BP line and BM line, the stub filter 24 according to the second embodiment is constituted of the twisted pair wire. It should be noted that a shielded twisted pair wire whose shield is grounded through the connector 14c1 can also be used.

The communication network according to the second embodiment is configured as aforementioned so that it becomes possible to prevent the network from external disturbances and/or noises to be applied, thereby enhancing noise durability. In other aspects, the configuration and effects are the same as that of the communication network 10 according to the first embodiment.

Third Embodiment

Figure 8:
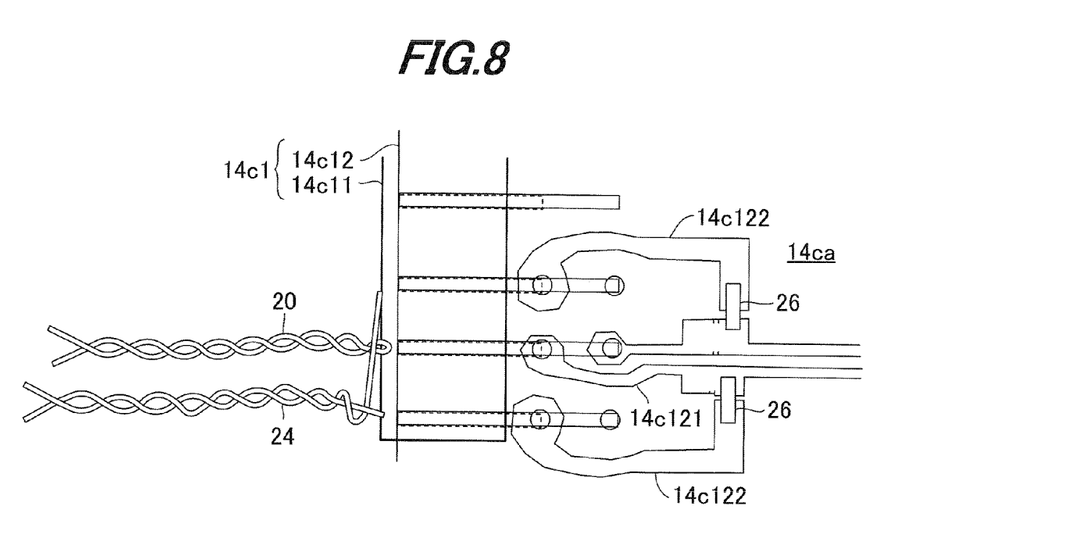
FIG. 8 is a partial top view similar to FIG. 4, but showing a connector of a communication network according to a third embodiment of this invention.
Figure 9:
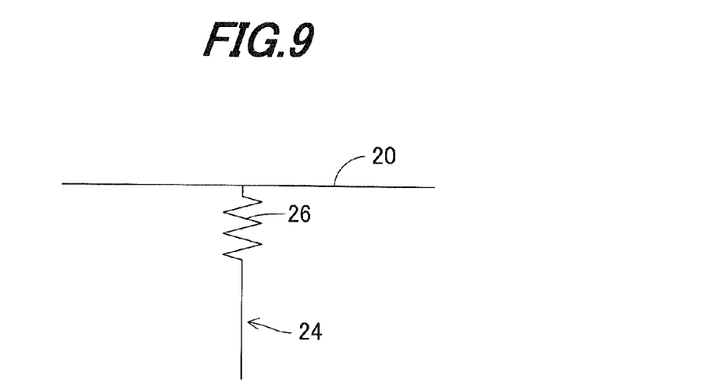
FIG. 9 is an explanatory view showing a connection of resistors shown in FIG. 8 at a conducting wire (stub filter).

FIG. 8 is a partial top view similar to FIG. 4, but showing the connector 14c1 of the ECU 14c of a communication network according to a third embodiment of this invention, and FIG. 9 is an explanatory view showing a connection of a resistor shown in FIG. 8 to the conducting wire (stub filter) 24.

Figure 10:
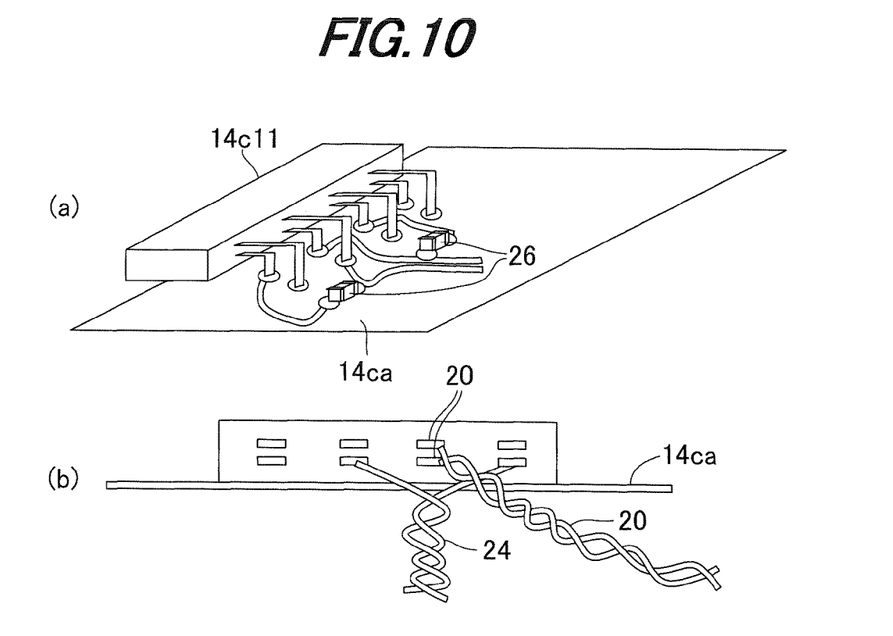
FIG. 10 is a set of explanatory views showing a connection of the connector of the communication network according to the third embodiment.

In the communication network 10 according to the third embodiment, a resistor 26 is each interposed at the branch terminal of the stub filter 24. Specifically, it is configured to connect the stub filter 24 to the branch path 20 via the resistors 26 with any resistance value as illustrated in FIGS. 9 and 10.

Figure 11:
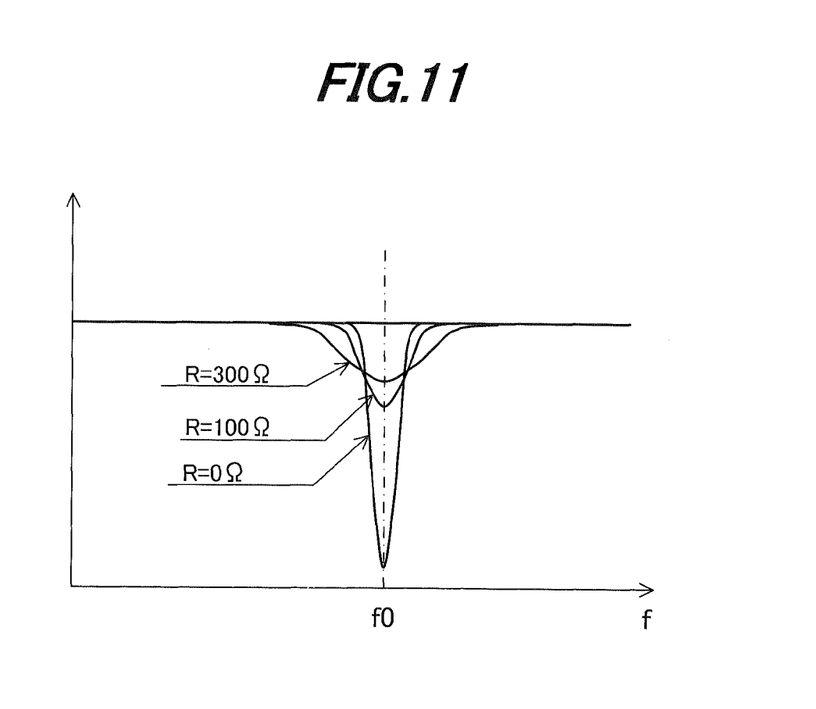
FIG. 11 is a graph for explaining characteristics when interposing a gain control resistor at the conducting wire (stub filter) shown in FIG. 8.

FIG. 11 is a graph showing filtering characteristics when interposing the resistor (gain control resistor) 26 at each of the conducting wires (stub filter) 24 shown in FIG. 8. With this configuration, it becomes possible to arbitrarily control a gain of the stub filter 24 so as to decrease amplification of the frequency in a broadband (a frequency band) by deteriorating Q (Quality factor) with the resistor. Consequently, it becomes possible to effectively remove a waveform distortion of frequencies around f0 (Center frequency) as shown in the graph.

Figure 12A:
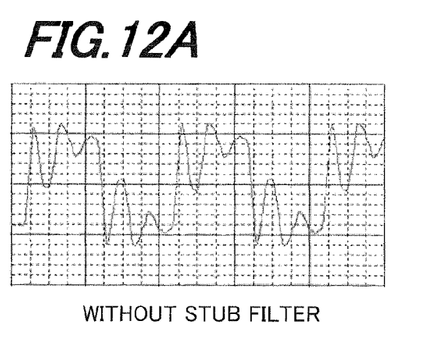
FIG. 12 is a set of graphs for explaining an effect of the gain control resistors interposed at the conducting wire (stub filter) shown in FIG. 8.
Figure 12B:
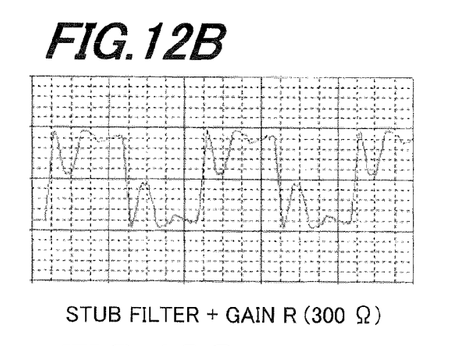
Figure 12C:
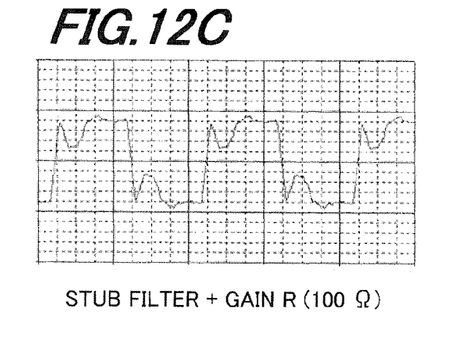

More exactly, the resistance value of the resistor 26 is selected so as to mitigate ringing of the received waveforms. FIG. 12 is a set of graphs showing the waveforms in cases of the communication network 10 without the stub filter 24 (a), with the stub filter 24 and a gain R (the gain control resistor 26) of 300Ω (b) and with the stub filter 24 and a gain R of 100Ω (c).

As mentioned above, since the communication network 10 according to the third embodiment is configured to connect the stub filter 24 to the branch path 20 via the resistor 26 so as to applicably select the resistance value of the resistor 26, it becomes possible to arbitrarily control the gain of the above-mentioned filter. In other aspects, the configuration and effects are the same as that of the communication network 10 according to the first embodiment.

Fourth Embodiment

Figure 13:
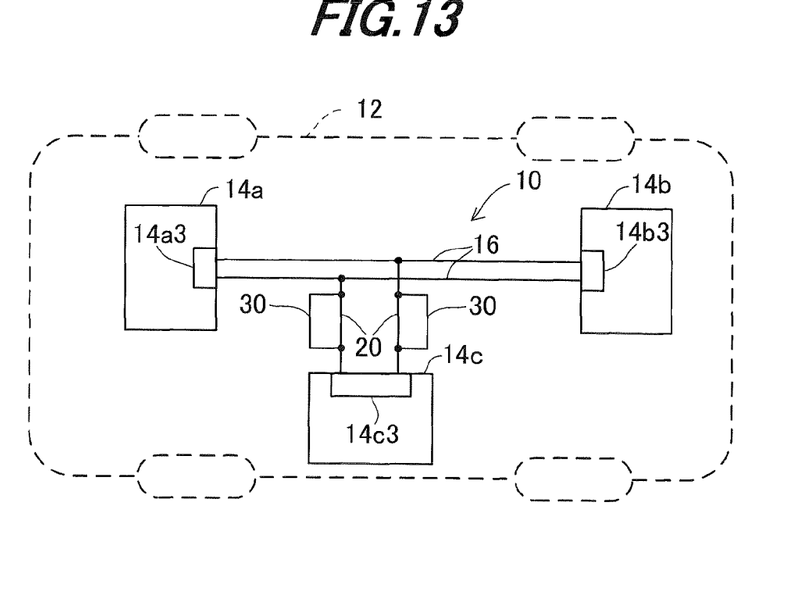
FIG. 13 is an overall schematic view similar to FIG. 1, but showing a communication network according to a fourth embodiment of this invention.
Figure 14:
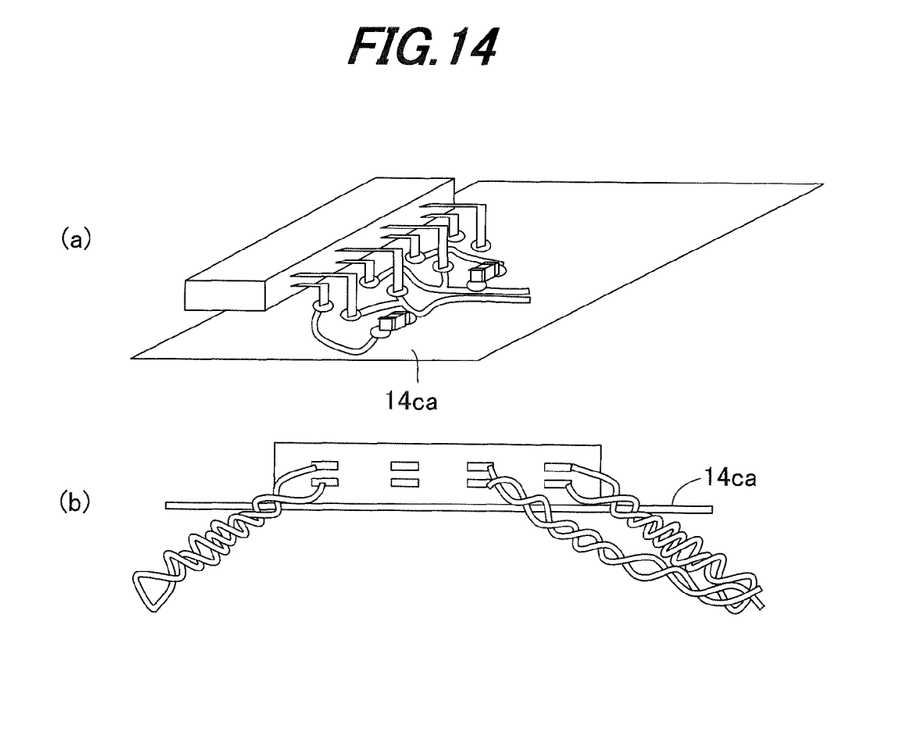
FIG. 14 is an explanatory view similar to FIG. 10, but showing a connection of the connector of the communication network according to the fourth embodiment of this invention.

FIG. 13 is an overall schematic view similar to FIG. 1, but showing a communication network according to a fourth embodiment of this invention, and FIG. 14 is an explanatory view similar to FIG. 10, but showing a connection of the connector of the communication network according to the fourth embodiment of this invention.

In the communication network 10 according to the fourth embodiment, conducting wires connected to the branch path 20 at both ends, i.e. a bypass circuit 30 in place of the conducting wire (stub filter) 24 released at one end is each installed for removing a waveform distortion.

The explanation will be made on this point. Although a moving speed of an electrical signal, i.e., a propagation delay time is 3.3 ns/m in a vacuum (as fast as the speed of light. More precisely, this value is based on the reciprocal number of the speed of light), the speed is slowed down to approximately 5 ns/m in the harness including the bus 16 and branch path 20 (which differs depending on permittivity and/or permeability of the configuration of the harness), so that it takes about 5 nanoseconds to transmit the signal for 1 meter. This delay is not acceptable when a transmission rate of the communication network 10 is set to several Mbps or more.

As explained above, since the buses (transmission path) 16 connected to the ECUs 14a, 14b are terminated with the termination circuits 22 corresponding to the characteristics impedance, distortions of the received waveforms transmitted therein are unlikely to occur insofar as the quality of the harness including the bus 16 is kept as expected.

On the other hand, in the ECU 14c connected via the branch path 20, in addition to a fact that no termination circuit 22 is provided, a reflection or permeation of the received waveforms occurs at the branch points, so that a waveform distortion may occur when the ECU 14c receives the waveforms.

In order to remove the distortion, it is configured to connect the bypass circuits (in other words, conducting wires connected to the branch path 20 at both ends) 30 to the two wire harness (a twisted pair wire) including the branch path 20 in the communication network 10 according to the forth embodiment, as illustrated in FIG. 13.

The harness constituting the bypass circuits 30 is configured in the same way as that of the conducting wire (stub filter) 24 and the harness including the bus 16 and branch path 20 so as to include the twisted pair wire which is made of copper, 0.5 millimeters across in diameter, and covered in vinyl material. It should be noted that a shielded twisted pair whose shield is grounded through the connector 14c1 can also be used.

Specifically, since the moving speed of the electrical signal is slowed down to approximately 5 ns/m in the harness including the branch path 20 (or the bus 16) and bypass circuits 30 so that it takes about 5 nanoseconds to transmit the signal for 1 meter, this embodiment turns the delay to its own advantage.

Figure 15:
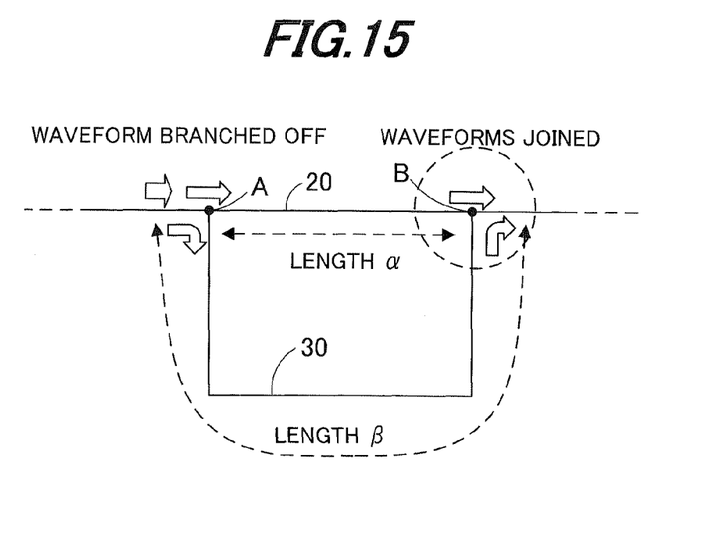
FIG. 15 is an explanatory view for explaining removal of a waveform distortion by installing a bypass circuit shown in FIG. 13.
Figure 16:
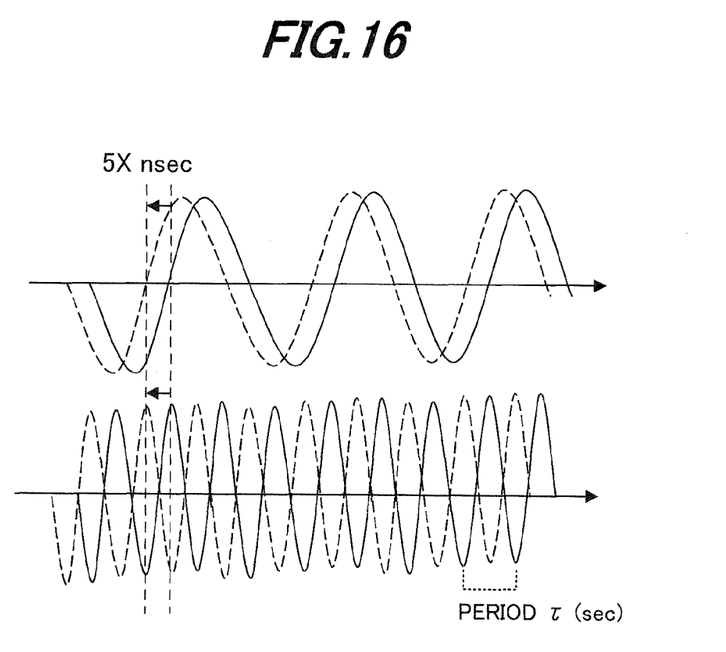
FIG. 16 is a time chart for explaining removal of a waveform distortion by installing the bypass circuit shown in FIG. 13.

As illustrated in FIG. 15, when the bypass circuit 30 is connected to the branch path 20 at points A and B, the length between the points A and B is defined as a, the total length of the bypass circuit 30 as β, and the length of β–α as X m. If the propagation delay time for the bus 16 (or the branch path 20) is, for example, 5 ns/m, a phase delay of the waveform of a period τ becomes 5× nanoseconds as shown in FIG. 16.

When a period of a reference wave of the waveform distortion components to be removed is defined as τ and a waveform whose phase delay (5× nanoseconds) is half the length of the period τ is inputted thereto, the waveforms combined at the point B are cancelled each other since one of the waveforms has the completely opposite phase to the other.

In other words, the fact of branching off wires with each having different length from the others and rejoining them (bypassing) corresponds to providing a filter shown by the following equation.

$$\text{Propagation delay time} \times \text{Difference of lengths} = (\tfrac{1}{2})\tau \quad \text{(Equation 1)}$$

It should be noted that since the period τ is a temporal interval while the wavelength λ is a spatial interval, the above explanation also corresponds to providing a filter of the wavelength λ shown by the following equation.

$$\lambda = 2 \times (\text{Propagation delay time} \times \text{Difference of lengths}) \quad \text{(Equation 2)}$$

In terms of frequency, it can be described as "Propagation delay time×Difference of lengths=(½)/f (Hz)". Consequently, when the frequency components to be removed are defined as f (Hz), it can be calculated by the following equation.

$$f = 1/\{2 \times (\text{Propagation delay time} \times \text{Difference of lengths})\} \quad \text{(Equation 3)}$$

Specifically, the frequency including distortions of the received waveforms of the ECU 14c should be analyzed to calculate the frequency components to be removed as the reference wave. It may also be applicable to consider the frequency of higher harmonics of the reference wave as the frequency to be removed. Further, when there are two or more of the reference waves of the waveform distortion components, the bypass circuit 30 should be installed for each of the reference waves of the waveform distortion components.

Next, the difference between the length of the branch path 20 and that of the bypass circuit 30 should be calculated through the equation 2 so as to set the length of the bypass circuit 30 accordingly. In an example shown in FIG. 13, when the frequency of the reference wave of the waveform distortion components is 8 MHz and the length a is 3 meters, the difference of the lengths is calculated as 12.5 meters so that the length of the bypass circuit 30 is set to 15.5 meters.

As mentioned above, in the fourth embodiment, it is configured to connect the conducting wires connected to the branch path 20 at both ends, i.e. the bypass circuit 30 to the branch path 20 so that the signal transmission time of the branch path 20 differs from that of the bypass circuit 30. Consequently, it becomes possible to remove distortions of signals with a simple structure.

As stated above, any of the first to fourth embodiments are configured to have a communication network 10 having an ECU 14a (first electronic control unit), ECU 14b (second electronic control unit), a bus 16 (transmission path) connecting the ECUs 14a, 14b, and an ECU 14c (third electronic control unit) connected to a branch path branched off from the transmission path 16 and communicatable with at least one of the ECUs 14a, 14b, the ECUs 14a, 14b being each terminated with a termination circuit 22 designed in accordance with a characteristic impedance of the bus 16, characterized in that a connection point 14ca is mounted on a circuit board 14cc in which the ECU 14c (third electronic control unit) is installed so that the ECU 14c is connected to the branch path 20 via a connector 14c1, and a conducting wire 24 for removing a waveform distortion is connected to the branch path 20 via the connector 14c1 at one end. With this, it becomes possible to remove distortions of signals with a simple structure.

Specifically, in the conducting wire 24 each connected to the branch path 20 at one end, the terminal at the other end of the conducting wire 24 is each made open (not connected) so that total reflection of communication waveforms occurs at the edge face. As a result, it becomes possible to use the conducting wire 24 as a band-pass filter (stub filter) of (¼) λ (λ: wavelength).

More exactly, the ECUs 14a, 14b, 14c are energized so that the received waveforms thereof are measured, and the frequency components including a distortion of the received waveforms are analyzed using the FFT in order to calculate the frequency components to be removed. The length of the conducting wire 24 is determined to be (¼) λ of the frequency of the calculated frequency components and the conducting wire 24 is connected to the branch path 20 so as to remove the waveform distortions of the signals.

Further, since it is possible to obtain desired filtering characteristics without changing the design of the ECUs 14 but externally adding a conducting wire, the configuration becomes simple. Also it becomes possible to change the design of wiring harness topologies until the final stage of development thereby improving the efficiency of mass production and development of the communication network 10.

Further, it is configured such that the connection point 14ca is mounted on the circuit board 14cc, in which the ECU 14c is installed, so as to be connected to the branch path 20 via the connector 14c1, i.e., the connection point 14ca is not created on the branch path 20. As a result, it becomes possible to enhance reliability of the connection point 14ca.

In the communication network 10 according to the third embodiment, it is configured to connect the stub filter (conducting wire) 24 to the branch path 20 via the resistor 26. With this, it becomes possible to arbitrarily control the gain of the stub filter 24 by applicably selecting the resistance value of the resistor 26.

Further, in the communication network 10 according to the fourth embodiment, it is configured so that the conducting wire 24 is constituted of the bypass circuit 30, i.e., the conducting wire 24 is also connected to the branch path 20 at the other end. With this, it becomes possible to remove distortions of signals by differing the signal transmission time from that of the branch path 20.

Further, in the communication network 10 according to the second and fourth embodiments, it is configured so that the conducting wire 24 is constituted of the twisted pair wire. With this, it becomes possible to prevent the network from external disturbances and/or noises to be applied, thereby enhancing noise durability.

It should be noted that, although the explanation is made with three ECUs 14, i.e., ECUs 14a, 14b, 14c as the electronic control units, the number of the ECUs can be equal to or more than four.

It should also be noted that, although the termination circuits 22 shown in the drawings include the resistor and capacitor, the termination circuits 22 may include only a resistor or all of or any of a resistor, capacitor and coil. Further, the circuits may include a ferrite bead.

It should also be noted that, although the vehicle is exemplified as transportation equipment, this invention can be applied to other transportation equipment such as an aircraft, vessel, autonomous robot and the like. Furthermore, this invention can be applied to fixed type equipment such as industrial equipment.

INDUSTRIAL APPLICABILITY

According to this invention, a communication network 10 having ECUs (first and second electronic control units) 14a, 14b, a bus (transmission path) 16 connecting the ECUs 14a, 14b, and an ECU (third electronic control unit) 14c connected to a branch path 20 branched off from the bus 16 and communicatable with at least one of the ECUs 14a, 14b, the ECUs 14a, 14b being each terminated with a termination circuit 22 designed in accordance with a characteristics impedance of the bus 16, characterized in that a connection point is mounted on a circuit board in which the ECU 14c is installed so that the ECU 14c is connected to the branch path 20 via a connector; and a conducting wire 24 for removing a waveform distortion is connected to the branch path via the connector. Therefore, it becomes possible to provide the communication network that removes the waveform distortions of signals among the electronic control units connected to the transmission path and/or the branch path with a simple structure.

DESCRIPTION OF SYMBOLS

10 Communication network, 12 Vehicle, 14, 14a, 14b, 14c ECU (Electronic Control Unit), 14ca Connection point, 14c1 Connector, 16 Bus (Transmission path), 20 Branch path (Transmission path), 22 Termination circuit, 24, Conducting wire (Stub filter), 26 Resistor, 30 Bypass circuit (Conducting wire)

The invention claimed is:

1. A waveform distortion removing apparatus for a communication network having a first electronic control unit, a second electronic control unit, a transmission path connecting the first and second electronic control units, and a third electronic control unit adapted to be connected to a branch path branched off from the transmission path and communicatable with at least one of the first and second electronic control units, the first and second electronic control units being each terminated with a termination circuit designed in accordance with a characteristic impedance of the transmission path,
    wherein the improvement comprises:
        a connector that is connected to a connection point mounted on a circuit board in which the third electronic control unit is installed so that the third electronic control unit is connected to the branch path via the connector; and
        a conducting wire for removing a waveform distortion connected to the branch path via the connector at one end,
    wherein a length of the conducting wire is determined in accordance with a frequency of a reference wave.

2. The apparatus according to claim 1, wherein the conducting wire is connected to the branch path via a resistor.

3. The apparatus according to claim 2, wherein the conducting wire is connected to the branch path at the other end.

4. The apparatus according to claim 3, wherein length from a point where the conducting wire at one end is connected to a point where the conducting wire at the other end is connected.

5. The apparatus according to claim 2, wherein the conducting wire is constituted of a twisted pair wire.

6. The apparatus according to claim 1, wherein the conducting wire is connected to the branch path at the other end.

7. The apparatus according to claim 6, wherein the conducting wire is constituted of a twisted pair wire.

8. The apparatus according to claim 6, wherein length from a point where the conducting wire at one end is connected to a point where the conducting wire at the other end is connected.

9. The apparatus according to claim 1, wherein the conducting wire is constituted of a twisted pair wire.

* * * * *